3,454,408
SOLDER GLASS COMPOSITIONS AND METHOD
OF SEALING METAL THEREWITH
Robert A. Busdiecker, Woodville, Ohio, assignor to
Owens-Illinois, Inc., a corporation of Ohio
No Drawing. Filed May 28, 1964, Ser. No. 371,081
Int. Cl. C03c 3/30, 27/02
U.S. Cl. 106—47                 23 Claims The present invention relates to glass compositions known as solder glasses that are particularly suitable for sealing glass to glass or glass to metals having relatively high coefficients of thermal expansion, and more particularly, to solder glass compositions having good fluidity at relatively low temperatures thereby making them specially applicable for sealing temperature sensitive metal articles. The present invention, in addition, relates to the method of sealing metal surfaces with the solder glass compositions referred to above.

In the past, various solder glass compositions have been developed for making seals. However, several difficulties have been encountered in employing prior known glass compositions such as, for example the necessity to resort to relatively high temperatures to obtain sufficient fluidity to make the seal, which may damage the delicate metal parts that are sealed. In addition, other sealing glasses have been unstable, tended to devitrify or have had other disadvantages associated therewith.

Accordingly, it is the object of the present invention to provide solder glass compositions that are capable of sealing to metals possessing a relatively high coefficient of thermal expansion and without resorting to excessive sealing temperatures to obtain a secure bond resistant to separation and which will avoid the disadvantages and short comings of the prior known methods and compositions.

It is a further object of the present invention to provide solder glass compositions of good fluidity at relatively low temperatures and possessing coefficients of thermal expansion such that a strong and secure bond to the metals is obtained.

It is a further object of the present invention to provide stable solder glass compositions having a satisfactory glassy range and that do not exhibit a marked tendency to devitrify.

It is a further object of the present invention to provide a method for sealing metal surfaces with solder glass compositions.

In attaining the above objects, one feature of the present invention resides in a solder glass composition containing a major proportion of the oxides of vanadium and lead expressed as $V_2O_5$ and PbO.

Another feature of the present invention resides in solder glass compositions comprising a major proportion of $V_2O_5$ and PbO combined, and at least two but no more than three of the following group:

BaO, ZnO, $MoO_3$, $BaF_2$

Other objects, features and advantages of the present invention will become apparent from the following detailed description thereof.

Described in greater detail, the present invention relates to high expansion, low temperature solder glass compositions comprising:

| | Percent |
|---|---|
| $V_2O_5$ | 35–55 |
| PbO | 30–50 | and at least two and no more than three of the following:

| | Percent |
|---|---|
| BaO | 2–5 |
| ZnO | 2–5 |
| $MoO_3$ | 5–15 |
| $BaF_2$ | 2–5 | and wherein the amount of $V_2O_5$ and PbO present together is at least 70%.

The present invention further includes solder glass compositions defined as above which additionally contain from 1 to 2% $P_2O_5$.

Further included in the present invention are high expansion, low temperature solder glass compositions as defined above which additionally contain from about 2 to about 5% $ZnF_2$.

Further high expansion, low temperature solder glass compositions included by the present invention are those defined above which additionally include from about 5 to 15% $WO_3$.

All of the solder glass compositions of the present invention are characterized by the presence of oxides of vanadium and lead expressed as $V_2O_5$ and PbO, respectively, which together constitute a major proportion of the total composition. Generally, the ratio of $V_2O_5$ to PbO is 0.8 to 1.9 with about 1 being preferred.

Characterized by relatively low sealing temperatures, the sealing glass compositions of the present invention are particularly valuable for sealing delicate metal parts such as copper miniature circuits and the like, which parts may be adversely affected by higher temperatures.

Representative of the glasses of the invention that are particularly valuable for sealing purposes are those having the following compositions:

(I)

| | Percent |
|---|---|
| $V_2O_5$ | 35–55 |
| PbO | 30–50 |
| ZnO | 2–5 |
| BaO | 2–5 |

(II)

| | Percent |
|---|---|
| $V_2O_5$ | 35–55 |
| PbO | 30–50 |
| ZnO | 2–5 |
| BaO | 2–5 |
| $P_2O_5$ | 1–2 |

(III)

| | Percent |
|---|---|
| $V_2O_5$ | 35–55 |
| PbO | 30–50 |
| ZnO | 2–5 |
| BaO | 2–5 |
| $MoO_3$ | 5–15 |

(IV)

| | Percent |
|---|---|
| $V_2O_5$ | 35–55 |
| PbO | 30–50 |
| ZnO | 2–5 |
| BaO | 2–5 |
| $WO_3$ | 5–15 |

(V)

| | Percent |
|---|---|
| $V_2O_5$ | 35–55 |
| PbO | 30–50 |
| BaO | 2–5 |
| $MoO_3$ | 5–15 |
| $ZnF_2$ | 2–5 |

(VI)

| | Percent |
|---|---|
| $V_2O_5$ | 35–55 |
| PbO | 30–50 |
| BaO | 2–5 |
| $MoO_3$ | 5–15 |
| $ZnF_2$ | 2–5 |
| ZnO | 2–5 |

All percentages referred to herein are by weight, and the ranges of compositions referred to herein are inclusive of the end figures quoted for each constituent.

Of course, in addition to the components specified in the various compositions, the glasses may be certain cases contain trace impurities derived from impurities in raw materials used in the manufacture of the glass.

In the compositions set forth herein, the various components are expressed in terms of their oxides and it will be understood that in preparing the solder glasses the components may be added in various forms. For obtaining compositions as defined herein it will be necessary to take into account losses due to volatilization and the like. Thus, the composition of the starting batch is adjusted accordingly, For the manufacture of a sealing glass according to the present invention, the batch can be prepared from the various ingredients commonly used in the art for providing the constituent oxides in their required amounts.

When used according to the methods of the present invention, the foregoing solder glass compositions are melted and are characterized by good fluidity at relatively low temperatures. For example, the glasses can be employed at temperatures of approximately 575° F. to 625° F. although temperatures of approximately 590° F. are more common.

Generally, it is advantageous to prepare the surface of the metal for the sealing operation although in certain instances it may not be necessary. Surface preparation can be accomplished by any one of several known methods of preparing surfaces prior to the sealing thereof. One method found to be particularly satisfactory is the borated surface treatment as described in Partridge, J. H. Glass to Metal Seals, The Society of Glass Technology, Sheffield, England, 1949, to which reference is made. Abraded surfaces are also suitable and can be prepared by grinding the surface with, for example, 60-mesh Carborundum, although any other satisfactory method for preparing the surfaces can be employed.

After the surface of the metal has been prepared so as to be suitable for the sealing operation, the solder glass can be pre-melted and poured over the glass surface to effect the seal. Alternatively, the seal can be made by employing glass in powder form which can be spread over the metal surface. Thereafter the seal assembly is exposed to elevated temperatures by inserting in a high temperature oven to melt the powdered glass and form the seal with the metal surface.

Another method of sealing the metal parts with the solder glass of the present invention resides in applying the glass to the metal in the form of an acetone-frit paste or slurry. Following drying, the metal is fired to produce the vitreous seal. The glass can also be in the form of cast rods (¼″ x ¼″ x 4½″) and applied as a thin glaze to the metal surface by heating in an oxygen-gas flame. Firing the glazed parts at about 350°C. will cause fusion and produce excellent seal in a few minutes.

It is to be understood that various methods and sources for heating the glass can be employed herein as will be readily apparent to those skilled in this technology. For example, ovens and furnaces, infra red, flame sealing and the like can be employed although oven or furnace type seals are usually preferred because of the simplicity of a temperature control. The oven seals can usually be made in air with no special heating or cooling procedures necessary. When employed for the preparation of copper seals, it has been found that the preferred form of copper is oxygen free, high conductivity copper.

Although being particularly useful for sealing to copper, it will be appreciated that the solder glasses of the present invention may be employed with other metals as well.

In testing glass compositions of the present invention to determine their physical constants, the glass in the form of powder is placed in a zircon "boat" in a gradient tube furnace having a temperature gradient of about 120° F. per inch. The test sample usually employed is a 15 gram, −180 mesh sample. At the end of one hour, the boat is removed from the furnace and allowed to cool.

In general, four distinct zones can be noted. At the cold end of the boat, the solder glass remains unchanged and exists as a free-flowing powder. At the temperature corresponding to a viscosity of about $10^{11.5}$ poises, fusion of the glass particles into a vitreous body takes place. This is called the glassy edge temperature. If the solder glass is reasonably stable, fused glass can be observed up to a higher temperature called the devitrification edge. The interval between the glassy edge and the devitrification edge temperature is called the glassy range. At temperatures at and above the devitrification edge and extending to the liquidus temperature, devitrification can be observed. This temperature interval is called the devitrification range. Above the liquidus temperature, there is vitreous glass. The advantages offered by the solder glasses of the present invention reside in their characteristic of suitable glassy range temperatures thereby permitting seals to be made without having to heat the glass to the high liquidus temperatures.

The glassy edge and devitrification edge temperatures are time dependent and in the tests shown in the examples that follow, a one-hour test was used. In actual practice, vitreous seals can be made at higher temperature, e.g. 5 minutes at 350° C.

It will be appreciated that accuracy of temperature measurement in a gradient tube furnace by means of a thermo-couple probe is limited because of inherent difficulties of obtaining such measurements. Therefore, actual temperatures may vary somewhat from those reported herein.

Examples I through XXI listed in the table below will serve to illustrate the glasses of the present invention; although the the compositions set forth therein are preferred they are not considered limiting of the invention in any way.

TABLE

|  | I | II | III | IV | V | VI | VII |
|---|---|---|---|---|---|---|---|
| $V_2O_5$ | 45 | 44.5 | 44 | 40 | 40 | 42.5 | 41.25 |
| PbO | 45 | 44.5 | 44 | 35 | 35 | 42.5 | 41.25 |
| ZnO | 5 | 5.0 | 5 | 5 | 5 | 5.0 | 5.0 |
| BaO | 5 | 5.0 | 5 | 5 | 5 | 5.0 | 5.0 |
| $P_2O_5$ |  | 1 |  |  |  |  |  |
| $MoO_3$ |  |  | 2 |  | 15 | 5.0 | 7.5 |
| $WO_3$ |  |  |  | 15 |  |  |  |
| $ZnF_2$ |  |  |  |  |  |  |  |
| $BaF_2$ |  |  |  |  |  |  |  |
| Properties condition of melt | Stable | Stable | Stable | Stable | Stable | Stable | Stable |
| Glassy edge, °C | 245 | 225 | 230 | 300 | 270 | 225 | 230 |
| Devitrification edge, °C | 275 | 260 | 260 | 350 | 360 | 270 | 275 |
| Liquidus, °C | 495 | 455 | 460 |  |  | 455 | 500 |

TABLE—Continued

|  | VIII | IX | X | XI | XII | XIII | XIV |
|---|---|---|---|---|---|---|---|
| $V_2O_5$ | 40 | 45 | 45 | 45 | 40 | 45 | 45 |
| PbO | 45 | 40 | 40 | 40 | 40 | 35 | 40 |
| ZnO | 5 | 5 |  |  | 5 | 5 | 5 |
| BaO | 5 | 5 | 5 | 5 | 5 | 5 |  |
| $P_2O_5$ |  |  |  |  |  |  |  |
| $MoO_3$ | 5 | 5 | 5 | 5 | 5 | 5 | 5 |
| $WO_3$ |  |  | 5 |  |  |  |  |
| $ZnF_2$ |  |  |  | 5 | 5 | 5 | 5 |
| $BaF_2$ |  |  |  |  |  |  |  |
| Properties condition of melt | Stable | Stable | Stable | Stable | Stable | Stable | Stable |
| Glassy edge, ° C | 230 | 230 | 230 | 190 | 250 | 255 | 245 |
| Devitrification edge, ° C | 275 | 275 | 270 | 245 | 300 | 290 | 270 |
| Liquidus, ° C | 475 | 450 | 470 | 445 | 505 | 530 | 535 |

|  | XV | XVI | XVII | XVIII | XIX | XX | XXI |
|---|---|---|---|---|---|---|---|
| $V_2O_5$ | 45 | 40 | 35 | 45 | 40 | 40 | 40 |
| PbO | 40 | 45 | 50 | 40 | 40 | 35 | 35 |
| ZnO | 5 |  |  | 5 | 5 | 5 | 5 |
| BaO | 5 | 5 | 5 |  | 5 | 5 | 5 |
| $P_2O_5$ |  | 5 | 5 | 5 | 5 | 10 | 5 |
| $MoO_3$ |  |  |  |  | 5 | 5 | 10 |
| $WO_3$ |  |  |  |  |  |  |  |
| $ZnF_2$ | 5 | 5 | 5 |  |  |  |  |
| $BaF_2$ |  |  |  | 5 |  |  |  |
| Properties condition of melt | Stable | Stable | Stable | Stable | Stable | Stable | Stable |
| Glassy edge, ° C | 255 | 242 | 240 | 237 | 275 | 265 | 280 |
| Devitrification edge, ° C | 280 | 305 | 300 | 285 | 330 | 330 | 340 |
| Liquidus, ° C | 525 | 470 | 455 | 435 | 440 | 500 | 450 |

In the table above the values given are expressed in weight percent.

EXAMPLE XXII

A sealing glass composition was prepared containing the following components:

|  | Percent |
|---|---|
| $V_2O_5$ | 45 |
| PbO | 40 |
| $ZnF_2$ | 5 |
| BaO | 5 |
| $MoO_3$ | 5 |

The above sealing glass composition was melted and found to have a glassy edge temperature of 190° C. and was used to form a satisfactory seal with copper which had been previously borated according to the method described in Partridge's book, Glass to Metal Seals referred to above. This composition gave particularly excellent results and therefore is most preferred.

EXAMPLE XXIII

A solder glass composition containing the following ingredients was prepared. The glass had a glassy edge temperature of 250° C.

|  | Percent |
|---|---|
| $V_2O_5$ | 40 |
| PbO | 40 |
| $ZnF_2$ | 5 |
| BaO | 5 |
| $MoO_3$ | 5 |
| ZnO | 5 |

A satisfactory seal to copper was produced.

The sealing glass compositions of the present invention have satisfactory stability and are exceptionally useful for sealing to metals having relatively high coefficients of thermal expansion. Moreover, the sealing glasses can be used at relatively low sealing temperatures which is convenient and desirable when working with temperature sensitive metals and articles.

Although the foregoing examples emphasize the particular suitability of the solder glasses of the present invention for sealing to copper surfaces it is, of course, to be understood that the sealing glasses can be employed with various other metals. Other uses for the sealing glass compositions described hereinabove include fabrication of blown, drawn or molded ware as will be apparent to those skilled in the art to which this invention pertains.

What is claimed is:

1. A high expansion, low temperature solder glass composition consisting essentially of:

|  | Percent |
|---|---|
| $V_2O_5$ | 35–55 |
| PbO | 30–50 | and at least two and no more than three of the following:

|  | Percent |
|---|---|
| BaO | 2–5 |
| ZnO | 2–5 |
| $MoO_3$ | 5–15 |
| $BaF_2$ | 2–5 | wherein the total of $V_2O_5$ and PbO present is at least about 70% and wherein BaO or ZnO are always present.

2. A high expansion, low temperature solder glass composition as defined in claim 1, which further contains from 1 to 2% $P_2O_5$.

3. A high expansion, low temperature solder glass composition as defined in claim 1 which further contains from about 2 to about 5% $ZnF_2$.

4. A high expansion, low temperature solder glass composition as defined in claim 1, which further contains from about 5 to about 15% $WO_3$.

5. A high expansion, low temperature solder glass composition consisting essentially of:

|  | Percent |
|---|---|
| $V_2O_5$ | 35–55 |
| PbO | 30–50 |
| ZnO | 2–5 |
| BaO | 2–5 | wherein the total of $V_2O_5$ and PbO present is at least about 90%.

6. A high expansion, low temperature solder glass composition consisting essentially of:

|  | Percent |
|---|---|
| $V_2O_5$ | 35–55 |
| PbO | 30–50 |
| ZnO | 2–5 |
| BaO | 2–5 |
| $P_2O_5$ | 1–2 | wherein the total of $V_2O_5$ and PbO present is at least about 88%.

7. A high expansion, low temperature solder glass composition consisting essentially of:

| | Percent |
|---|---|
| $V_2O_5$ | 35–55 |
| PbO | 30–50 |
| ZnO | 2–5 |
| BaO | 2–5 |
| $MoO_3$ | 5–15 | wherein the total of $V_2O_5$ and PbO present is at least about 75%.

8. A high expansion, low temperature solder glass composition consisting essentially of:

| | Percent |
|---|---|
| $V_2O_5$ | 35–55 |
| PbO | 30–50 |
| ZnO | 2–5 |
| BaO | 2–5 |
| $WO_3$ | 5–15 | wherein the total of $V_2O_5$ and PbO present is at least about 75%.

9. A high expansion, low temperature solder glass composition consisting essentially of:

| | Percent |
|---|---|
| $V_2O_5$ | 35–55 |
| PbO | 30–50 |
| BaO | 2–5 |
| ZnO | 2–5 |
| $MoO_3$ | 5–15 |
| $ZnF_2$ | 2–5 | wherein the total of $V_2O_5$ and PbO present is a least 70%.

10. A high expansion, low temperature solder glass composition consisting of

| | Percent |
|---|---|
| $V_2O_5$ | 35–55 |
| PbO | 30–50 |
| BaO | 2–5 |
| $MoO_3$ | 5–15 |
| $WO_3$ | 5–15 |
| ZnO | 2–5 | wherein the total of $V_2O_5$ and Pbo present is a least 70%.

11. A high expansion, low temperature solder glass composition consisting essentially of

| | Percent |
|---|---|
| $V_2O_5$ | 35–55 |
| PbO | 30–50 |
| BaO | 2–5 |
| $MoO_3$ | 5–15 |
| $WO_3$ | 5–15 | wherein the total of $V_2O_5$ and PbO present is at least 70%.

12. A high expansion, low temperature solder glass composition consisting essentially of:

| | Percent |
|---|---|
| $V_2O_5$ | 35–55 |
| PbO | 30–50 |
| BaO | 2–5 |
| $MoO_3$ | 5–15 |
| $ZnF_2$ | 2–5 | wherein the total of $V_2O_5$ and PbO present is at least 75%.

13. A high expansion, low temperature solder glass composition consisting essentially of:

| | Percent |
|---|---|
| $V_2O_5$ | 35–55 |
| PbO | 30–50 |
| ZnO | 2–5 |
| $MoO_3$ | 5–15 |
| $ZnF_2$ | 2–5 | wherein the total of $V_2O_5$ and PbO present is at least 75%.

14. A high expansion, low temperature solder glass composition consisting essentially of

| | Percent |
|---|---|
| $V_2O_5$ | 35–55 |
| PbO | 30–50 |
| ZnO | 2–5 |
| $MoO_3$ | 5–15 |
| $BaF_2$ | 2–5 | wherein the total of $V_2O_5$ and PbO present is at least about 75%.

15. A high expansion, low temperature solder glass composition consisting essentially of:

| | Percent |
|---|---|
| $V_2O_5$ | 45 |
| PbO | 40 |
| BaO | 5 |
| $MoO_3$ | 5 |
| $ZnF_2$ | 5 |

16. A high expansion, low temperature solder glass composition consisting essentially of:

| | Percent |
|---|---|
| $V_2O_5$ | 45 |
| PbO | 40 |
| BaO | 5 |
| $MoO_3$ | 5 |
| $WO_3$ | 5 |

17. A high expansion, low temperature solder glass composition consisting essentially of:

| | Percent |
|---|---|
| $V_2O_5$ | 45 |
| PbO | 40 |
| $ZnF_2$ | 5 |
| $MoO_3$ | 5 |
| ZnO | 5 |

18. A method of sealing metal surfaces which comprises applying to the metal surface a solder glass composition possessing a desirable glassy range and being capable of use at relatively low sealing temperatures and possessing a relatively high coefficient of thermal expansion which approximates the coefficient of thermal expansion of the metal and forming a seal between the glass and the metal at elevated temperature and thereafter cooling, said solder glass composition consisting essentially of

| | Percent |
|---|---|
| $V_2O_5$ | 35–55 |
| PbO | 30–50 | and at least two and no more than three of the following:

| | Percent |
|---|---|
| BaO | 2–5 |
| $MoO_3$ | 5–15 |
| ZnO | 2–5 |
| $BaF_2$ | 2–5 | wherein the total of $V_2O_5$ and Pbo present is at least about 70% and wherein BaO and ZnO are always present.

19. The method as defined in claim 18 wherein the metal surface is roughened before the seal is made.

20. A method as defined in claim 18 wherein the metal is copper.

21. A method as defined in claim 18 wherein the solder glass composition further contains from 2 to about 5% $ZnF_2$.

22. A method as defined in claim 18 where the solder glass composition further contains from 1 to 2% $P_2O_5$.

23. A method as defined in claim 18 wherein the solder glass composition further contains from about 5 to about 15% $WO_3$.

References Cited

UNITED STATES PATENTS 2,663,658  12/1953  Schurecht _____ 106—48

FOREIGN PATENTS 744,947   2/1956  Great Britain.
1,015,993 9/1957  Germany.

HELEN M. McCARTHY, *Primary Examiner.*

U.S. Cl. X.R.

106—49; 117—129; 156—89; 161—196